Patented July 22, 1952

2,604,475

UNITED STATES PATENT OFFICE 2,604,475

BENZO[f]QUINOLINE COMPOUNDS AND PROCESS FOR THEIR PREPARATION

Charles F. H. Allen and James A. Van Allan, Rochester, N. Y., assignors to Eastman Kodak Company, Rochester, N. Y., a corporation of New Jersey No Drawing. Application December 29, 1950, Serial No. 203,528

16 Claims. (Cl. 260—287)

This invention relates to a process for the preparation of nuclear sulfonated 1-carboxy-3-monocyclic aryl-benzo[f]quinoline compounds and to certain of these compounds as new compounds.

According to the present invention, nuclear sulfonated 1 - carboxy - 3 - monocyclic aryl-benzo[f]quinoline compounds are prepared by reacting a monocyclic aromatic aldehyde, pyruvic acid and a 2-naphthylamine sulfonic acid together in the presence of a substantial amount of water. An alkaline agent such as sodium carbonate, potassium carbonate, lithium carbonate, ammonium carbonate, sodium bicarbonate or potassium bicarbonate, for example, can be added to the reaction mixture if desired. However, the amount of the alkaline agent added to the reaction mixture is insufficient to neutralize the pyruvic acid.

Normally the sodium salt form of the 2-naphthylamine sulfonic acid is employed but any other water soluble salt form or the free acid form can be used. Thus the potassium, the lithium and the ammonium salt forms, for example, can be used. Solution of the reactants is desirable and accordingly sufficient water is used in the reaction as will effect enough solution of the reactants as will bring about ready reaction between the reactants. Thus by "a substantial amount of water" is meant sufficient water to effect ready reaction between the reactants. While the amount of water required varies somewhat depending upon the reactants, those skilled in the art will have no difficulty in determining the proper amount of water to use. The representative examples given hereinafter are illustrative of the amount of water to use.

For purposes of clarification, it is here noted that benzo[f]quinoline has the formula:

I
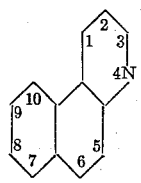

The numbering given is that employed herein. Benzo[f]quinoline is also known as 4-azaphenanthrene.

We are aware that Döbner and Kuntze have prepared 1-carboxy-3-phenyl-benzo[f]quinoline, from β - naphthylamine, benzaldehyde and pyruvic acid in ether solution at room temperature, or in absolute alcohol with warming [Ann. 249, 135 (1888)]. However, this method is not satisfactory where a sulfonated β-naphthylamine is used. Additionally, the use of water in place of ether or absolute alcohol where a non-sulfonated β-naphthylamine is used is not satisfactory.

So far as is known to us both the process and the compounds of our invention are novel. Thus the invention makes available new and useful nuclear sulfonated 1-carboxy-3-monocyclic aryl-benzo[f]quinoline compounds in which the position of the sulfonic acid group is known. Few sulfonated benzo[f]quinoline compounds appear to be disclosed in the prior art. This may be due to the fact that sulfonation of quinoline and benzoquinoline compounds is, generally speaking, unsatisfactory. Sulfonation does not take place readily, a mixture of isomers is usually formed, the separation of which is tedious, and the location of the entering sulfonic acid group is often uncertain and can not be determined easily. By contrast, the process of the present invention takes place readily and sulfonated compounds wherein the position of the sulfonic acid group is known are obtained.

The compounds of the invention possess application as filter dyes. As noted hereinafter certain of the compounds are especially useful for absorbing light at a wave length of about 360–400 millimicrons, i. e. at or near the boundry between the ultraviolet and the violet. The compounds of the invention also possess utility as intermediates for the preparation of other compounds. Also, those compounds which absorb light at wave lengths of about 295 to 320 millimicrons may be useful in protecting against sunburn.

Compounds which are stable to light and will absorb light having a wave length of from about 360 to about 400 millimicrons are especially desirable. A considerable number of compounds that will absorb light of a wave length of 300 to 320 millimicrons are known but there is a need for light stable compounds that will absorb light having a wave length of about 360 to about 400 millimicrons. We have discovered that the water soluble salts of the compounds having the formula:

II
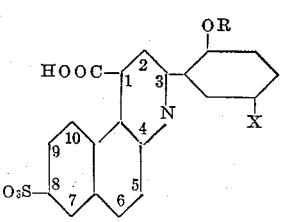

wherein R represents a member selected from the group consisting of a hydrogen atom and the benzoyl group and X represents a member selected from the group consisting of a hydrogen atom and a chlorine atom, possess outstanding stability to light and have the desirable property of absorbing light of a wave length of about 360 to about 400 millimicrons. Especial claim is made to these compounds.

The following examples illustrate both the process and the new compounds of the invention.

Example 1

219 grams of sodium 2-naphthylamine-6-sulfonate and 74 grams of salicylaldehyde were mixed in 1550 cc. of water at 45° C. After 10 minutes 80 grams of pyruvic acid and 4 grams of sodium carbonate in 20 cc. of water were added. The reaction mixture was heated for 4 hours on a steambath and then boiled vigorously for 10 minutes. 1 liter of a saturated salt solution was added to the boiling reaction mixture with good stirring. On chilling 164 grams of 1-carboxy-3-(2'-hydroxyphenyl)-8-sodium sulfo-benzo[f]quinoline separated out as bright yellow crystals. It is sufficiently pure for most purposes without purification.

A portion of the above compound was converted to the mono sodium mono lithium salt form by redissolving in water with the aid of lithium carbonate, treating the reaction mixture with a decolorizing carbon such as Norite, filtering, evaporating the filtrate to dryness under reduced pressure, extracting the residue with methyl alcohol and evaporating the alcoholic extract to dryness. 15 parts of the 1-carboxy-3-(2'-hydroxyphenyl)-8-sodium sulfo-benzo[f]quinoline yielded 14 parts of the bright yellow salt 1-lithium carboxy-3-(2'-hydroxyphenyl)-8-sodium sulfo-benzo[f]quinoline having the formula:

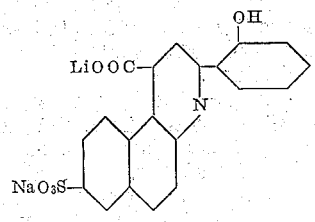

in a high state of purity.

By the use of sufficient aqueous ammonia in place of lithium carbonate 1-ammonium carboxy-3-(2'-hydroxyphenyl)-8-sodium sulfo-benzo[f]quinoline was prepared.

Similarly, by the use of sufficient triethanolamine in place of lithium carbonate 1-triethanolamine carboxy-3-(2'-hydroxyphenyl)-8-sodium sulfo-benzo[f]quinoline was prepared.

Example 2

11.9 grams of the sodium salt of 2-amino-8-naphthol-6-sulfonic acid, 6 grams of pyruvic acid, 5 grams of benzaldehyde, 2.6 grams of sodium carbonate and 75 cc. of water were refluxed together for 4 hours after which 50 cc. of a saturated salt solution was added. The product, 1-carboxy-3-phenyl-8-sodium sulfo-10-hydroxy-benzo[f]quinoline, immediately separated and was recovered by filtration. It was purified by recrystallization from water.

Example 3

12.2 grams of the sodium salt of 2-naphthylamine-6-sulfonic acid were dissolved in 100 cc. of hot water and 7.8 grams of 2-hydroxy-5-chlorobenzaldehyde and 3.4 cc. of pyruvic acid were added thereto. The resulting reaction mixture was heated on the steambath for 24 hours and then heated to boiling. 100 cc. of a saturated aqueous sodium chloride solution were added, with stirring, to the reaction mixture which was then chilled and filtered. The product collected on the filter was taken up in 200 cc. of water and the mixture resulting was made alkaline by the addition of sodium carbonate; treated with a decolorizing carbon, such as Norite, and filtered, 200 cc. of an aqueous saturated sodium chloride solution were added to the reaction mixture which was allowed to stand at room temperature over a week end and then filtered. 8 grams of 1-sodium carboxy-3-(2'-hydroxy-5'-chlorophenyl)-8-sodium sulfo-benzo[f]quinoline were obtained as large bright yellow crystals.

Example 4

24.8 grams of purified 2-naphthylamine-6-sulfonic acid were dissolved in 200 cc. of water containing 4 grams of sodium hydroxide in a 1-liter flask and warmed on a steam bath. 3 grams of a decolorizing carbon (Norite) were added and the hot solution was filtered. A clear light brown solution was thus obtained. 12.2 grams of salicylaldehyde were added to the warm filtrate which solidified to a pale yellow crystalline mass. The reaction mixture thus obtained was well shaken and 9 grams of pyruvic acid were added thereto. The flask containing the reaction mixture was immersed in a steam bath and shielded with a cloth. After one half hour of heating the temperature was 96° C. and thereafter remained constant. The reaction mixture was well shaken from time to time and after two hours heating on the steam bath solution was complete. The reaction mixture at this point was clear and bright red and had a pH of 4. After 3½ hours heating there was no change in pH and the reaction mixture was still clear and bright red. After heating for a total of 5 hours on the steam bath the reaction mixture was heated to reflux and 200 cc. of a hot saturated aqueous sodium chloride solution were added and the reaction mixture was allowed to stand at room temperature until precipitation was complete (24 hours). The bright yellow crystals which precipitated were recovered by filtration and after sucking dry as possible they were washed with 50 cc. of a saturated aqueous sodium chloride solution and dried. 24 grams of 1-carboxy-3-(2'-hydroxyphenyl)-8-sodium sulfo-benzo[f]quinoline were thus obtained.

22 grams of the product obtained as described above were dissolved in 200 cc. of boiling water and 4 grams of sodium carbonate were added. Then 3 grams of a decolorizing carbon (Norite) were added and after stirring a short time the reaction mixture was filtered and the filtrate was acidified with 20 cc. of concentrated HCl at a temperature of about 60° C.–80° C. and then filtered. 1-carboxy-3-(2'-hydroxyphenyl)-8-sodium sulfo-benzo[f]quinoline in purified form was obtained on the filter. After drying a yield of 12.5 grams of product was obtained.

11.5 grams of the product obtained as just described were dissolved in 100 cc. of water containing 3.2 grams of sodium carbonate and heated to boiling. The reaction mixture thus obtained was treated while hot with 2 grams of a decolorizing carbon (Norite) and then filtered. 100 cc. of a saturated aqueous sodium chloride solution was added to the filtrate and the reaction mixture was boiled and then allowed to cool slowly to room temperature after which it was placed in an ice chest for one hour. After cooling, the reaction mixture was filtered and the product collected on the filter was washed with 25 cc. of a saturated aqueous sodium chloride solution and dried. 10 grams of 1-sodium carboxy - 3 - (2' - hydroxyphenyl) - 8 - sodium sulfo-benzo[f]quinoline were obtained.

Example 5

11.9 grams of 2-amino-8-naphthol-6-sulfonic acid, 6 grams of pyruvic acid and 6.8 grams of anisaldehyde, 2000 cc. of water and 2.6 grams of sodium carbonate were placed in a suitable reaction vessel, refluxed together for 35 hours and then filtered. 500 cc. of a saturated aqueous sodium chloride solution were added to the filtrate and the reaction mixture was chilled and after the reaction product had precipitated the reaction mixture was filtered. The product recovered on the filter was washed with a saturated aqueous sodium chloride solution and then dried. 11.1 grams of 1-carboxy-3-(p-methoxyphenyl) - 8 - sodium sulfo - 10 - hydroxybenzo-[f]quinoline were obtained.

Example 6

11.9 grams of 2-amino-5-naphthol-7-sulfonic acid, 5.3 grams of benzaldehyde, 2.6 grams of sodium carbonate, 6 grams of pyruvic acid and 2000 cc. of water were refluxed together for 4 hours and then filtered while hot. 500 cc. of a saturated aqueous sodium chloride solution were added to the hot reaction mixture and then the reaction mixture was chilled and filtered. The product obtained on the filter was dissolved in dilute aqueous ammonia, reprecipitated by means of dilute HCl and recovered by filtration. The product obtained on the filter was washed with a saturated aqueous sodium chloride sodium and then dried. 14 grams of 1-carboxy-3-phenyl-7-hydroxy-9-sodium sulfo-benzo[f]quinoline were obtained.

Example 7

4 grams of 1-sodium carboxy-3-(2'-hydroxyphenyl)-8-sodium sulfo-benzo[f]quinoline were dissolved in 100 cc. of water containing 5 cc. of 40% aqueous NaOH and 1.5 cc. of benzoyl chloride was added with good stirring at 5° C. The temperature of the reaction mixture was allowed to rise to 25° C. and then an equal volume of a saturated aqueous sodium chloride solution was added. The reaction product, 1-sodium carboxy-3 - (2' - benzoxyphenyl) - 8 - sodium sulfo-benzo[f]quinoline separated as bright yellow crystals and was recovered by filtration and dried. A yield of 3.1 grams was obtained.

Example 8

12.2 grams of the sodium salt of 2-naphthylamine-6-sulfonic acid, 4.7 grams of salicylaldehyde and 6 grams of pyruvic acid were reacted together and worked up in accordance with the general procedure described hereinbefore to obtain 1 - carboxy - 3 - (2' - hydroxyphenyl) - 8-sodium sulfo-benzo[f]quinoline.

Example 9

11.5 grams of the sodium salt of 2-amino-8-naphthol-6-sulfonic acid, 5.3 grams of benzaldehyde and 6 grams of pyruvic acid were reacted together and worked up in accordance with the general procedure described hereinbefore to obtain 1 - carboxy - 3 - phenyl - 8 - sodium sulfo-10-hydroxy-benzo[f]quinoline.

Example 10

12.2 grams of the sodium salt of 2-naphthylamine-6-sulfonic acid, 5.2 grams of benzaldehyde and 6 grams of pyruvic acid were reacted together and worked up in accordance with the general procedure described hereinbefore to obtain 1-lithium carboxy-3-phenyl-8-sodium sulfo-benzo[f]quinoline.

Example 11

12.2 grams of the sodium salt of 2-naphthylamine-6-sulfonic acid, 8.6 grams of 2-hydroxy-1-naphthaldehyde and 6 grams of pyruvic acid were reacted together and worked up in accordance with the general procedure described hereinbefore to obtain 1 - carboxy - 3 - (2' - hydroxynaphthyl)-8-sodium sulfo-benzo[f]quinoline.

Following the procedure described hereinbefore, 1-sodium carboxy-3-(4'-methoxyphenyl)-8-sodium sulfo-benzo[f]quinoline, 1-carboxy-3-(2'-methoxyphenyl)-8-sodium sulfo - benzo[f]-quinoline and 1-sodium carboxy-3-(2'-chlorophenyl)-8-sodium sulfo-benzo[f]quinoline also were prepared.

Spectrophotometric curves show that the compounds having the formula numbered II are good absorbers of light having a wave length of about 360 to about 400 millimicrons. These compounds, as previously indicated, have outstanding stability to light and possess this quality for example in a gelatine medium. Spectrophotometric curves indicate that the compounds of Examples 2, 5 and 10 as well as 1-sodium carboxy-3-(2'-chlorophenyl)-8-sodium sulfo-benzo[f]quinoline may be useful in protecting against sunburn. The salt form of the compounds appears to have little effect on the light absorption properties of the compounds.

We claim:

1. The process of preparing nuclear sulfonated 1-carboxy-3-monocyclic aryl - benzo[f]quinoline compounds which comprises reacting a monocyclic aryl aldehyde, pyruvic acid and a member selected from the group consisting of a 2-naphthylamine sulfonic acid in its free acid form and a water soluble salt of a 2-naphthylamine sulfonic acid together in the presence of a substantial amount of water.

2. The process of preparing nuclear sulfonated 1-carboxy-3-monocyclic aryl - benzo[f]quinoline compounds which comprises reacting a monocyclic aryl aldehyde containing no more than 10 carbon atoms in the monocyclic aryl nucleus, pyruvic acid and a 2-naphthylamine sulfonic acid in its free acid form together in the presence of a substantial amount of water.

3. The process of preparing nuclear sulfonated 1-carboxy-3-monocyclic aryl - benzo[f]quinoline compounds which comprises reacting a monocyclic aryl aldehyde containing no more than 6 carbon atoms in the monocyclic aryl nucleus, pyruvic acid and a 2-naphthylamine sulfonic acid in its free acid form together in the presence of a substantial amount of water.

4. The process of preparing nuclear sulfonated 1-carboxy-3-monocyclic aryl - benzo[f]quinoline compounds which comprises reacting a monocyclic aryl aldehyde containing no more than 10 carbon atoms in the monocyclic aryl nucleus, pyruvic acid and a water soluble salt of a 2-naphthylamine sulfonic acid together in the presence of a substantial amount of water.

5. The process of preparing nuclear sulfonated 1-carboxy-3-monocyclic aryl - benzo[f]quinoline compounds which comprises reacting a monocyclic aryl aldehyde containing no more than 6 carbon atoms in the monocyclic aryl nucleus, pyruvic acid and a water soluble salt of a 2- naphthylamine sulfonic acid together in the presence of a substantial amount of water.

6. The process of preparing a 1-carboxy-8-sulfo-benzo[f]quinoline compound containing an ortho hydroxyphenyl nucleus in the 3-position which comprises reacting an ortho hydroxy substituted benzaldehyde, pyruvic acid and a water soluble salt of a 2-naphthylamine-6-sulfonic acid together in the presence of a substantial amount of water.

7. The process of preparing a 1-carboxy-3-(2'-hydroxyphenyl)-3-sulfo-benzo[f]quinoline compound which comprises reacting salicylaldehyde, pyruvic acid and a water soluble salt of a 2-naphthylamine-6-sulfonic acid together in the presence of a substantial amount of water.

8. The water soluble salts of the compounds having the formula:

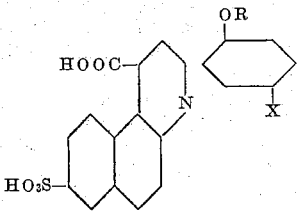

wherein R represents a member selected from the group consisting of a hydrogen atom and the benzoyl group and X represents a member selected from the group consisting of a hydrogen atom and a chlorine atom.

9. The water soluble salts of the compounds having the formula:

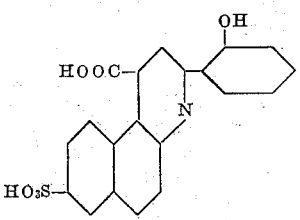

10. The water soluble salts of the compounds having the formula:

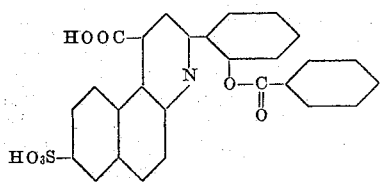

11. The water soluble salts of the compounds having the formula:

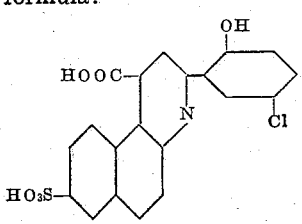

12. The compound having the formula:

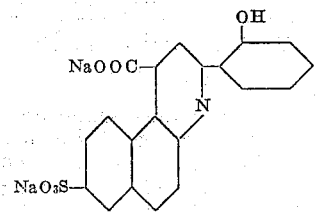

13. The compound having the formula:

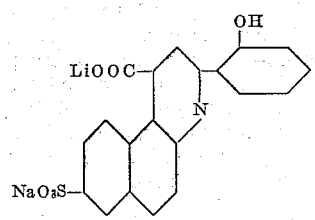

14. The compound having the formula:

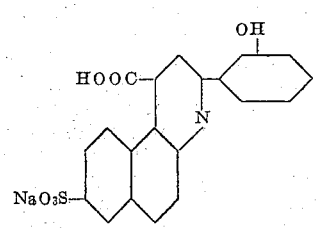

15. The compound having the formula:

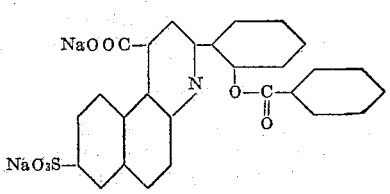

16. The compound having the formula:

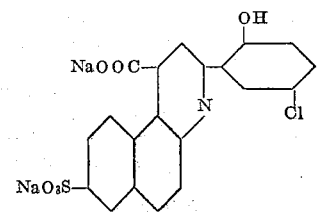

CHARLES F. H. ALLEN.
JAMES A. VAN ALLAN.

No references cited.